US009796292B2

(12) United States Patent
Jung et al.

(10) Patent No.: US 9,796,292 B2
(45) Date of Patent: Oct. 24, 2017

(54) SYSTEM AND METHOD FOR COOLING ELECTRIC VEHICLE

(71) Applicants: Hyundai Motor Company, Seoul (KR); Kia Motors Corporation, Seoul (KR); Dong—A University Research Foundation for Industry-Academy Cooperation, Seongnam, Gyeonggi-Do (KR)

(72) Inventors: Tae Hee Jung, Gyeonggi-Do (KR); Tae Young Chung, Gyeonggi-Do (KR); Moo Yeon Lee, Busan (KR); Jae Hyeong Seo, Busan (KR)

(73) Assignees: Hyundai Motor Company, Seoul (KR); Kia Motors Corporation, Seoul (KR); Dong-A University Research Foundation for Industry-Academy Cooperation, Busan (KR)

( * ) Notice: Subject to any disclaimer, the term of this patent is extended or adjusted under 35 U.S.C. 154(b) by 124 days.

(21) Appl. No.: 14/826,906

(22) Filed: Aug. 14, 2015

(65) Prior Publication Data

US 2016/0159246 A1    Jun. 9, 2016

(30) Foreign Application Priority Data

Dec. 9, 2014    (KR) .......................... 10-2014-0175974

(51) Int. Cl.
*B60L 11/18*    (2006.01)
*H05K 7/20*    (2006.01)
(Continued)

(52) U.S. Cl.
CPC ............ *B60L 11/1874* (2013.01); *B60K 1/04* (2013.01); *B60K 2001/003* (2013.01); *B60K 2001/006* (2013.01); *Y02T 10/7005* (2013.01)

(58) Field of Classification Search
CPC .. B60L 11/1874; B60L 11/18; B60L 15/2045; B60L 11/1861; B60L 1/003;
(Continued)

(56) References Cited

U.S. PATENT DOCUMENTS 5,624,003 A * 4/1997 Matsuki ............ B60H 1/00278
                                                                                180/65.1
5,641,031 A * 6/1997 Riemer .................... B60K 1/04
                                                                                180/68.5

(Continued)

FOREIGN PATENT DOCUMENTS

JP    H0688525 A    3/1994
JP    2005-199986    7/2005
(Continued)

*Primary Examiner* — Mohammad M Ali
(74) *Attorney, Agent, or Firm* — Mintz Levin Cohn Ferris Glovsky and Popeo, P.C.; Peter F. Corless

(57) ABSTRACT

A system for cooling a vehicle including a power conversion component, a motor, a radiator, an electronic water pump, and a cooling unit cooling the power conversion component includes: an air conditioning unit configured to interlock with the cooling unit to perform air conditioning of the vehicle; a temperature sensor configured to sense a temperature of air in the air conditioning unit; a cooling water temperature sensor configured to sense a temperature of cooling water flowing in the cooling unit; and a cooling control controller configured to calculate a targeted air flow rate and a targeted cooling water flow rate to control the cooling of the cooling unit.

15 Claims, 7 Drawing Sheets

(51) Int. Cl.
  *B60K 1/04* (2006.01)
  *B60K 1/00* (2006.01)

(58) Field of Classification Search
  CPC ....... B60L 1/02; B60K 1/04; B60K 2001/006;
    B60K 2001/003; Y02T 10/7005; Y02T
    10/7283; Y02T 10/645; Y02T 10/74;
    H05K 7/20
  USPC .......................................................... 62/243
  See application file for complete search history.

(56) References Cited

U.S. PATENT DOCUMENTS

| | | | |
|---|---|---|---|
| 8,408,165 B2 | 4/2013 | Moffat et al. | |
| 2010/0101306 A1* | 4/2010 | Suematsu | C01B 3/0005 73/40.7 |
| 2011/0118924 A1* | 5/2011 | Nasu | B60L 15/2045 701/22 |
| 2012/0067545 A1* | 3/2012 | Yamazaki | F01M 5/00 165/52 |
| 2012/0318586 A1* | 12/2012 | Atarashi | B60L 5/005 180/2.1 |
| 2013/0263802 A1* | 10/2013 | Lee | F01P 7/16 123/41.08 |

FOREIGN PATENT DOCUMENTS

| | | |
|---|---|---|
| JP | 2008-185021 A | 8/2008 |
| KR | 2010-0062661 | 6/2010 |
| KR | 2011-0026768 | 3/2011 |
| KR | 10-2012-0137916 A | 12/2012 |
| KR | 10-2013-0026872 A | 3/2013 |
| KR | 10-2013-0128881 | 11/2013 |
| KR | 10-2014-0051399 | 4/2015 |

* cited by examiner

SYSTEM AND METHOD FOR COOLING ELECTRIC VEHICLE

CROSS-REFERENCE TO RELATED APPLICATION

This application claims under 35 U.S.C. §119(a) the benefit of Korean Patent Application No. 10-2014-0175974, filed on Dec. 9, 2014 in the Korean Intellectual Property Office, the entire contents of which are incorporated herein by reference.

BACKGROUND (a) Technical Field

The present invention relates to a system and method for cooling an electric vehicle, and more particularly, to an arrangement for improving efficiency of a cooling system and reducing power consumption by automatically controlling a speed of a fan of a radiator and a driving speed of an electronic water pump.

(b) Description of the Related Art

Generally, an electric vehicle has been developed for the purpose of reducing air pollution and replacing limited fluid energy with a new energy source which drives a motor with power of a battery to assure drivability of a predetermined vehicle speed or more.

The electric vehicle is configured to include a battery which generates electric energy and a motor driving system which supplies electric energy generated from the battery to the motor.

The motor driving system of the electric vehicle is configured to include an inverter, a converter, a motor control unit, a motor, an on-board charger (OBC), power conversion components, etc., in which the power conversion components are equipment which generates high temperature heat, the OBC generates heat at the time of charging and the inverter, the converter, the motor control unit, and the motor generate heat while driving and at the time of operating electronic parts.

The heat generation adversely affects performance and lifespan of the power conversion components and therefore includes a cooling system to solve a problem of heat generation.

As the related art, there are technologies of determining an output flow rate value of an electronic water pump using a plurality of temperature sensors in electronic devices and preventing insufficient cooling of the electronic devices, controlling an operation of an electric pump using a motor control unit, controlling an operation of the motor to disperse a load applied to the existing main control unit, and when the electric pump is not controlled by the motor control unit, controlling the electric pump using the main control unit.

Existing technologies provide cooling control but do not consider a problem of increasing power consumption due to overcooling.

SUMMARY

An aspect of the present invention provides a system and method for cooling an electric vehicle capable of improving a cooling efficiency and reducing power consumption by automatically controlling a speed of a cooling fan of a radiator and a driving speed of an electronic water pump by calculating a required cooling water flow rate and a required air flow rate.

According to an exemplary embodiment of the present invention, a system for cooling an electric vehicle including a power conversion component, a motor, a radiator, an electronic water pump, and a cooling unit cooling the power conversion component, includes: an air conditioning unit configured to interlock with the cooling unit to perform air conditioning of the vehicle; a temperature sensor configured to sense a temperature of air in the air conditioning unit; a cooling water temperature sensor configured to sense a temperature of cooling water flowing in the cooling unit; and a cooling control controller configured to calculate a targeted air flow rate and a targeted cooling water flow rate to control the cooling of the cooling unit.

The system may further include: a wind velocity sensor configured to sense a wind velocity of air entering the air conditioning unit.

The wind velocity sensor may be disposed at an input terminal of the air conditioning unit.

The temperature sensor may be disposed at an input terminal of the air conditioning unit.

The temperature sensor may be disposed between the air conditioning unit and the radiator.

The cooling water temperature sensor may include: a first cooling water temperature sensor configured to be disposed at an input side of the radiator; and a second cooling water temperature sensor configured to be disposed at an output side of the radiator.

The cooling water temperature sensor may include: a first cooling water temperature sensor configured to be disposed at an output side of the electronic water pump; and a second cooling water temperature sensor configured to be disposed at an output side of the motor.

The cooling control controller may use property values of cooling water at an inlet side of the radiator, a temperature difference between the inlet side and an outlet side of the radiator, and a heat value of the power conversion component to calculate the targeted cooling water flow rate, such that when a temperature of the power conversion component is equal to or more than a preset safety temperature and the vehicle is in a driving mode, the cooling control controller may determine an RPM of the electronic water pump depending on the targeted cooling water flow rate.

The cooling control controller may calculate the targeted air flow rate to control a level of the fan of the radiator depending on the targeted air flow rate, when a current RPM of the electronic water pump is a maximum value or a temperature of the cooling water at the outlet side of the radiator is equal to or more than a maximum required temperature.

The cooling control controller may use property values of the cooling water of the inlet side of the radiator, a wind velocity and a temperature of air entering the air conditioning unit, a temperature of the cooling water of the inlet side of the radiator, and the heat value of the power conversion component to calculate the targeted air flow rate.

The cooling control controller may use the property values of the cooling water of the inlet side of the radiator, an intermediate temperature between the radiator and the air conditioning unit, a heat value of the power conversion component, and a temperature of the cooling water at the inlet side of the radiator to calculate the targeted air flow rate.

The cooling control controller may set the level of the fan of the radiator to be a first level when the current RPM of the electronic water pump is the maximum value or the temperature of the cooling water of the outlet side of the radiator is equal to or more than a maximum required temperature and then sets a level of the fan of the radiator to be a second level when the temperature of the power conversion component or the cooling water of the outlet side of the radiator is increased.

According to another exemplary embodiment of the present invention, a cooling method of a system for cooling an electric vehicle including an air conditioning unit, a power conversion component, a motor, a radiator, and an electronic water pump and including a cooling unit to cool the power conversion component, may include: determining whether a temperature of the power conversion component is equal to or more than safety temperature and a vehicle is in a driving mode condition, calculating a targeted cooling water flow rate when a temperature of the power conversion component is equal to or more than the safety temperature and the vehicle is in the driving mode condition to control a driving of the electronic water pump depending on the targeted cooling water flow rate; and controlling a fan of the radiator when the electronic water pump is maximally driven or a temperature of cooling water at an outlet side of the radiator is equal to or more than a maximum required temperature.

The controlling of the fan of the radiator may include: using property values of cooling water of an inlet side of the radiator, a wind velocity and a temperature of air entering the air conditioning unit, a temperature of cooling water of the inlet side of the radiator, and a heat value of the power conversion component to calculate the targeted air flow rate; and controlling a level of the fan of the radiator using the targeted air flow rate.

The controlling of the fan of the radiator may include: using property values of the cooling water of the inlet side of the radiator, an intermediate temperature between the radiator and the air conditioning unit, a heat value of the power conversion component, and a temperature of the cooling water at the inlet side of the radiator to calculate the targeted air flow rate; and controlling a level of the fan of the radiator using the targeted air flow rate.

The controlling of the fan of the radiator may include: determining whether a current RPM of the electronic water pump is a maximum value or a temperature of cooling water at an outlet side of the radiator is equal to or more than a maximum required temperature; setting a level of the fan of the radiator to be a first level when the current RPM of the electronic water pump is the maximum value or the temperature of the cooling water at the outlet side of the radiator is equal to or more than the maximum required temperature; and setting the level of the fan of the radiator to be a second level when the temperature of the power conversion component or the temperature of the cooling water at the outlet side of the radiator is increased.

A non-transitory computer readable medium containing program instructions executed by a processor, may include: program instructions that determine whether a temperature of a power conversion component is equal to or more than a safety temperature and a vehicle is in a driving mode condition; program instructions that calculate a targeted cooling water flow rate when the temperature of the power conversion component is equal to or more than the safety temperature and the vehicle is in the driving mode condition to control a driving of an electronic water pump depending on the targeted cooling water flow rate; and program instructions that control a fan of a radiator when the electronic water pump is maximally driven or a temperature of cooling water at an outlet side of the radiator is equal to or more than a maximum required temperature.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
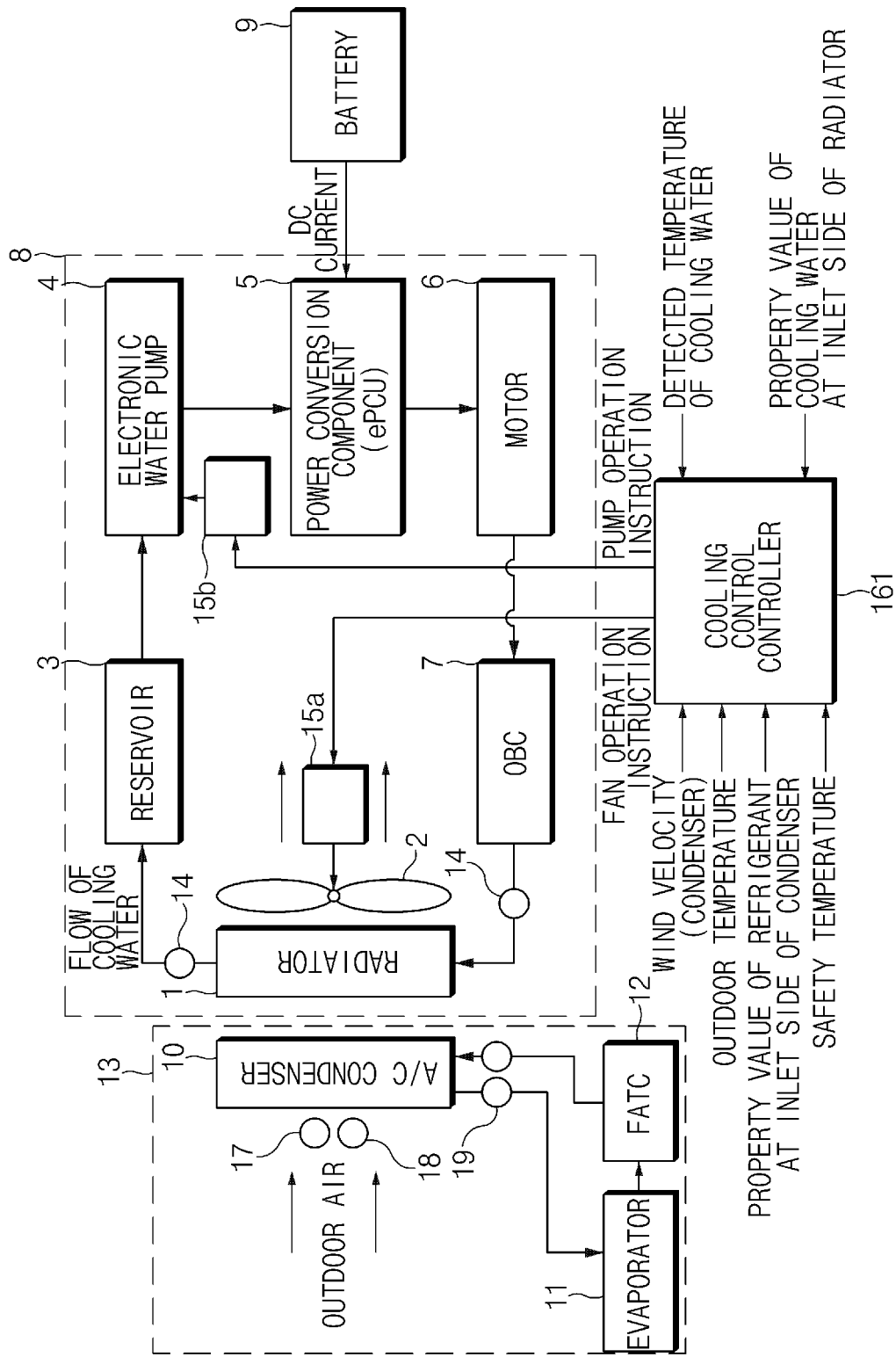
FIG. 1 is a configuration diagram of a system for cooling an electric vehicle according to a first exemplary embodiment of the present invention.

Hereinafter, embodiments of the present invention will be described in detail with reference to the accompanying drawings so that those skilled in the art may easily practice the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention discloses a control technology of using a single radiator and electronic water pump to effectively cool power conversion components in a driving system of an electric vehicle which is configured to include an inverter, a motor, a motor control unit, an on-board charger (OBC), and related components.

Further, the present invention discloses a cooling control technology based on a thermal equilibrium concept that a heat absorption amount of power parts is equal to a heat generation amount of the fan of the radiator.

Hereinafter, exemplary embodiments of the present invention will be described in detail with reference to FIGS. 1 to 7.

FIG. 1 is a configuration diagram of a system for cooling an electric vehicle according to a first exemplary embodiment of the present invention. The system for cooling an electric vehicle according to the first exemplary embodiment calculates an actual heat value of a radiator by subtracting a heat value of an A/C condenser 10 from cooling capacity between the A/C condenser 10 and a radiator 1. In particular, the system for cooling an electric vehicle according to the first exemplary embodiment of the present invention uses the heat value of the A/C condenser 10 to calculate cooling capacity at an air side of the radiator 1 and cooling capacity at a cooling water side thereof.

To this end, the system for cooling an electric vehicle according to the first exemplary embodiment of the present invention includes a cooling unit 8, a battery 9, an air conditioning unit 13, a cooling water temperature sensor 14, a wind velocity sensor 17, an outdoor temperature sensor 18, a refrigerant temperature sensor 19, a cooling fan controller 15a, an electronic water pump controller 15b, and a cooling control controller 161.

The cooling unit 8 includes a radiator 1, a cooling fan 2, a reservoir 3, an electronic water pump 4, a power converter 5, a motor 6, and an on-board charger (OBC) 7.

The radiator 1 refers to a pipe in which cooling water circulating a circumference of an engine is cooled by a flow of air.

The cooling fan 2 is connected to the radiator 1 and thus an impeller thereof is turned to move gas such as air and draw the air into a heat sink to help the radiator 1 to cool cooling water.

The reservoir 3 is a cooling water tank and has a predetermined amount of cooling water remaining therein. The electronic water pump 4 is a pump for forcibly circulating the cooling water.

The power converter 5 is an electronic power control unit (EPCU) which controls electricity and includes an inverter, a converter, a motor control unit, a high voltage divider, and the like.

The motor 6 drives an electric vehicle.

The OBC 7 is an on-board charger and serves to charge the battery 9.

The battery 9 charges or discharges electricity.

The air conditioning unit 13 controls an air conditioner and a heater to control cooling, heating, dehumidification, and the like inside the vehicle, thereby maintaining an indoor space of the vehicle at desired temperature settings. The air conditioning unit 13 includes an A/C condenser 10, an evaporator 11, and a full automatic temperature control (FATC) 12.

The A/C condenser 10 condenses air along with the cooling fan 2.

The evaporator 11 is equipment which is injected with a liquid refrigerant reduced to low temperature and low pressure to exchange heat with a surrounding space or a cooled object so as to perform freezing with heat absorption by liquid evaporation.

The FATC 12 is an auto temperature control apparatus and automatically controls an inflow state of an air flow direction, an air flow rate, indoor temperature, and outdoor temperature to maintain an indoor space at desired temperature settings independent of an outdoor state.

The cooling water temperature sensor 14 senses a temperature of cooling water input to the radiator 1 and a temperature of cooling water output from the radiator 1. To this end, the cooling water temperature sensor 14 is provided at an inlet and an outlet of the radiator 1.

The wind velocity sensor 17 senses a wind velocity of air input from the outside and the outdoor temperature sensor 18 senses an outdoor temperature of air input from the outside. To this end, the wind velocity sensor 17 and the outdoor temperature sensor 18 are disposed in front of the A/C condenser 10 to sense the wind velocity and temperature of air prior to passing through the A/C condenser 10.

The refrigerant temperature sensor 19 is disposed at the inlet and the outlet of the A/C condenser to sense a temperature of a refrigerant input to the A/C condenser 10 and a temperature of a refrigerant output therefrom.

The cooling fan controller 15a controls a driving of the cooling fan 20 under the control of the cooling control controller 161.

The electronic water pump controller 15b controls a driving of the electronic water pump 4 under the control of the cooling control controller 161.

The cooling control controller 161 determines whether a current temperature of the power conversion component 5 is equal to or more than a safety temperature and if it is determined that the current temperature is equal to or more than the safety temperature, determines whether a current vehicle is in a driving mode. Then, if it is determined that the vehicle is not in the driving mode, the cooling control controller 161 sets an RPM of the electronic water pump 4 to be a minimum value to minimally drive the electronic water pump 4. Meanwhile, when the vehicle is in the driving mode, the cooling control controller 161 calculates a heat value $Q_{heat\ value}$ of the power conversion component 5.

Further, when the temperature of the power conversion component 5 is equal to or more than the preset safety temperature and the vehicle is in the driving mode, the cooling control controller 161 uses property values $\epsilon_{radiator}, (C_p \cdot \rho)_{in,air}$ of the cooling water of an inlet side of a radiator, a temperature difference between an inlet side and an outlet side of the radiator, the heat value $Q_{heat\ value}$ of the power conversion component, and a heat value $Q_{condenser}$ of the condenser to calculate the targeted cooling water flow rate $V_{Rad,in,air}$ and determines the RPM of the electronic water pump depending on a targeted cooling water flow rate.

In this case, the targeted cooling water flow rate $V_{Rad,in,air}$ is calculated based on the following Equation 1.

$$\frac{Q_{Heat\ value}}{(C_P \cdot \rho)_{Rad,in,water} \cdot (T_{Rad,in,water} - T_{Rad,out,water})} = V_{Rad,in,water}[m^3/s] \quad \text{[Equation 1]}$$

In the above Equation 1, $C_p$ means specific heat in a unit of J/kg·K and ρ means a density in a unit of kg/m3, in which the specific heat and the density value may use preset experiment values as property values of the radiator. $T_{Rad,in,air}$ water means the temperature of cooling water at the inlet side of the radiator and $T_{Rad,out,air}$ means the temperature of cooling water at the outlet side of the radiator.

Further, when the current RPM of the electronic water pump is a maximum value or the temperature of the cooling water at the outlet side of the radiator is equal to or more than a maximum required temperature, the cooling control controller 161 calculates the targeted air flow rate to control a level of the fan 2 of the radiator 1 depending on the targeted air flow rate. In this case, the targeted air flow rate $V_{in,air,goal}$ is calculated based on the following Equation 2.

$$\frac{Q_{Heat\ value}}{\varepsilon_{radiator} \cdot (C_P \cdot \rho)_{in,air} \cdot \left\{T_{Rad,in,water} - \left(\frac{Q_{Condensor}}{(C_P \cdot \rho \cdot V)_{in,air}} + T_{in,air}\right)\right\}} = V_{in,air,goal} \quad \text{[Equation 2]}$$

The heat value $Q_{heat\ value}$ means a heat value, the heat value $Q_{condensor}$ is a condenser heat value, Tin, air means the outdoor temperature, the $V_{in,air}$ means the wind velocity, the $T_{Rad,in,water}$ means the temperature of the cooling water at the inlet side of the radiator, and the $C_p$ means the specific heat, and the ρ means the density.

Figure 2:
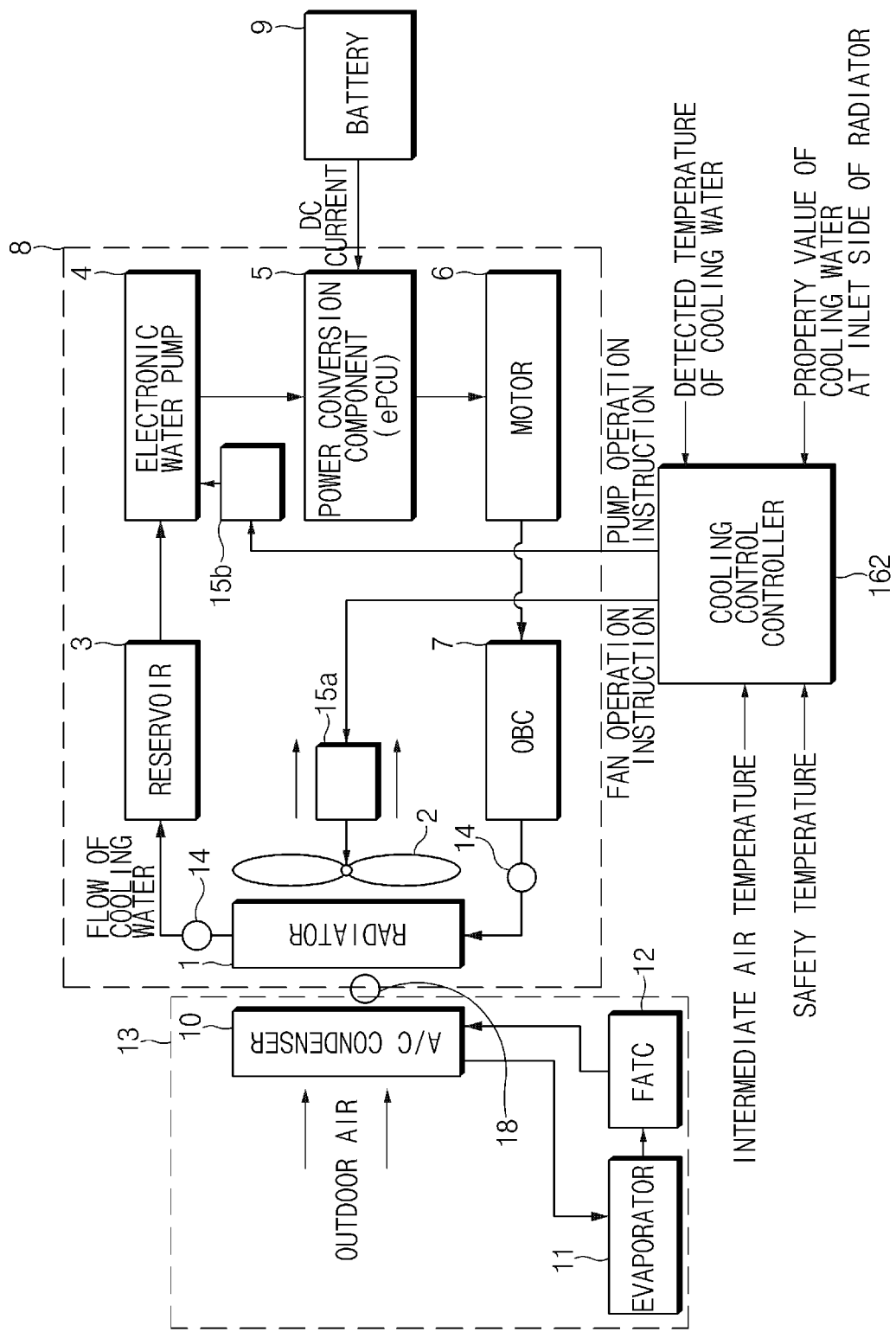
FIG. 2 is a configuration diagram of a system for cooling an electric vehicle according to a second exemplary embodiment of the present invention.

FIG. 2 is a configuration diagram of a system for cooling an electric vehicle according to a second exemplary embodiment of the present invention. The system for cooling an electric vehicle according to the second exemplary embodiment directly receives air temperature information passing through the A/C condenser 10 to directly calculate the cooling capacity at the air side of the radiator 1 and consider the influence of the A/C condenser 10. In particular, the system for cooling an electric vehicle according to the second exemplary embodiment of the present invention uses air temperature of the whole surface of the radiator 1 to calculate the cooling capacity at the air side and the cooling capacity at the cooling water side.

According to the system for cooling an electric vehicle according to the second exemplary embodiment of the present invention, in FIG. 1, the temperature sensor 18 is positioned at an output terminal of the A/C condenser 10, that is, positioned between the A/C condenser 10 and the radiator 1 to sense the temperature of the outdoor air which passes through the A/C condenser 10. Further, the system for cooling an electric vehicle according to the second exemplary embodiment of the present invention does not include the refrigerant temperature sensor 19.

The cooling control controller 162 calculates the targeted cooling water flow rate based on the same Equation 1 as the first exemplary embodiment of the present invention. However, the second exemplary embodiment of the present invention is different from the first exemplary embodiment of the present invention in that the targeted air flow rate is calculated using an intermediate temperature Tm between the A/C condenser 10 and the radiator 1.

The cooling control controller 162 uses the property values $\varepsilon_{radiator}$, $(C_p \cdot \rho)$ in, air of the cooling water of an inlet side of a radiator, the intermediate temperature Tm between the radiator and the air conditioning unit, the heat value of the power conversion component, and the temperature $T_{Rad,in,water}$ of the cooling water of the inlet side of the radiator to calculate the targeted air flow rate $V_{in,air,goal}$.

The cooling control controller 162 calculates the targeted air flow rate based on the following Equation 3.

$$\frac{Q_{Heat\ value}}{\varepsilon_{radiator} \cdot (C_P \cdot \rho)_{in,air} \cdot \{T_{Rad,in,water} - T_m\}} = V_{in,air,goal}[m^3/s] \quad \text{[Equation 3]}$$

The rest configuration is the same as FIG. 1 and therefore the detailed description thereof will be omitted.

Figure 3:
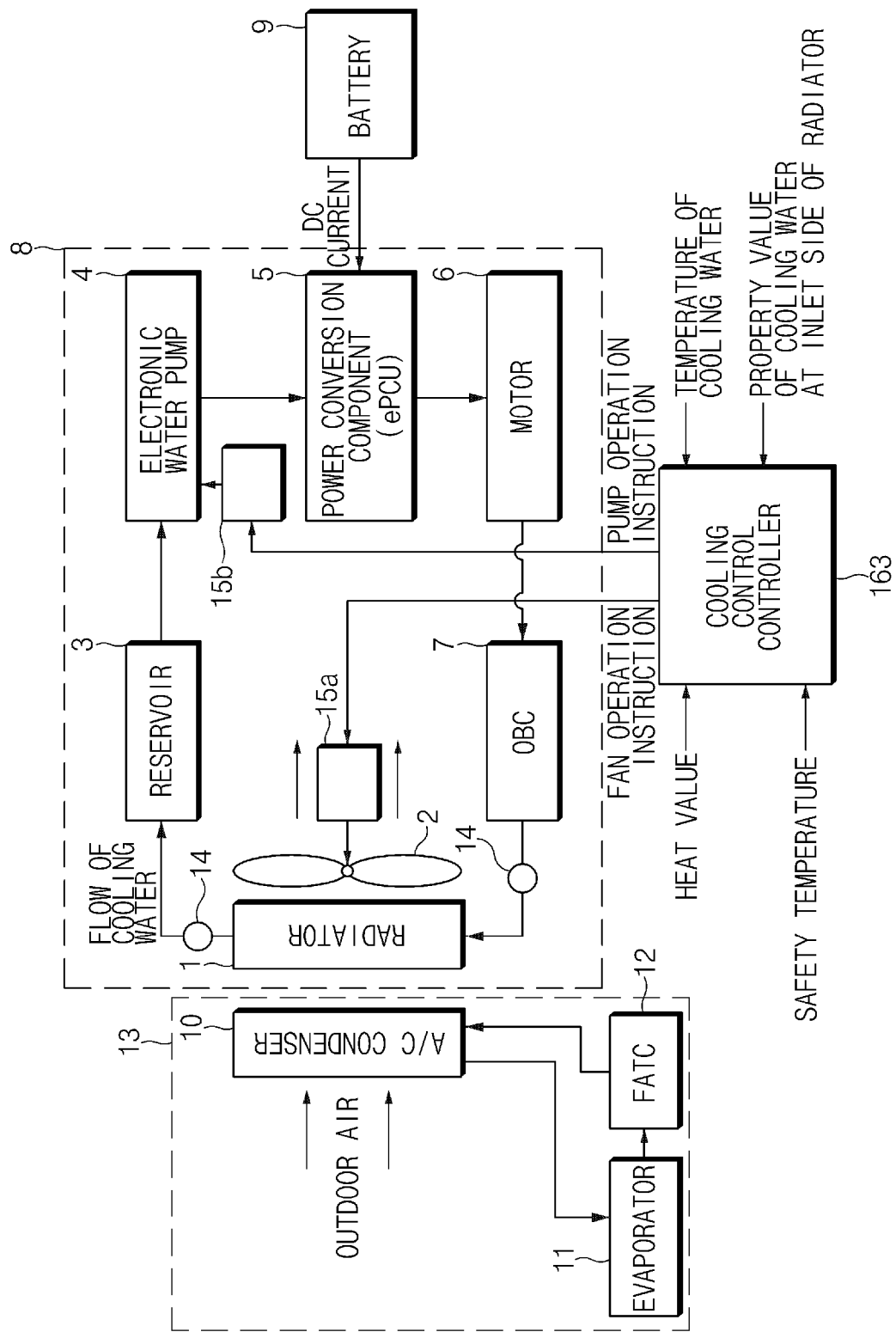
FIG. 3 is a configuration diagram of a system for cooling an electric vehicle according to a third exemplary embodiment of the present invention.

FIG. 3 is a configuration diagram of a system for cooling an electric vehicle according to a third exemplary embodiment of the present invention.

The system for cooling an electric vehicle according to the third exemplary embodiment of the present invention controls cooling in consideration of only the cooling capacity at the cooling water side. Further, the system for cooling an electric vehicle according to the third exemplary embodiment of the present invention does not include the wind velocity sensor 17, the temperature sensor 18, and the refrigerant temperature sensor 19.

Similar to the cooling control controller 161, a cooling control controller 163 calculates the targeted cooling water flow rate based on the above Equation 1 but controls the fan of the radiator without calculating the targeted air flow rate.

In particular, the cooling control controller 163 determines whether the current RPM of the electronic water pump 4 is a maximum value or the temperature of the cooling water at the outlet side of the radiator is equal to or more than the maximum required temperature and if it is determined that the current RPM of the electronic water pump 4 is a maximum value or the temperature of the cooling water at the outlet side of the radiator is equal to or more than the maximum required temperature, sets the level of the fan of the radiator to be a first level and if it is determined that the temperature of the power conversion component or the temperature of the cooling water at the outlet side of the radiator is increased, sets the level of the fan of the radiator to be a second level.

The rest configuration is the same as FIG. 1 and therefore the detailed description thereof will be omitted.

Figure 4:
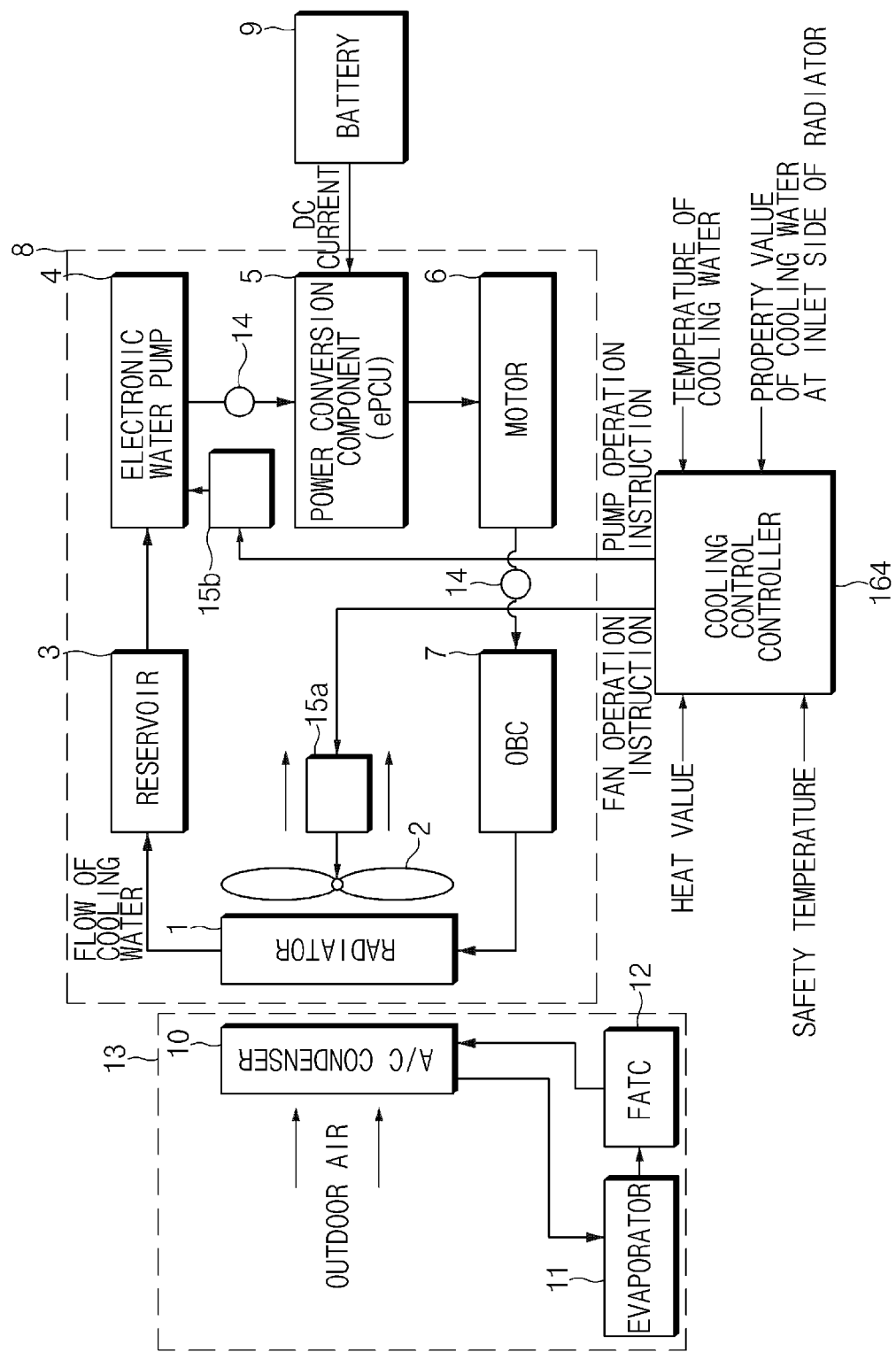
FIG. 4 is a configuration diagram of a system for cooling an electric vehicle according to a fourth exemplary embodiment of the present invention.

FIG. 4 is a configuration diagram of a system for cooling an electric vehicle according to a fourth exemplary embodiment of the present invention. The system for cooling an electric vehicle according to the fourth exemplary embodiment is arranged to control the cooling system in consideration of only the cooling capacity at the cooling water side and is an example in which the position of the cooling water temperature sensor 14 is changed when it may not know a section other than the power conversion component (ePCU) 5 and the motor 6 at the time of calculating the cooling capacity at the cooling water side and the cooling capacity of the apparatus.

The system for cooling an electric vehicle according to the fourth exemplary embodiment of the present invention has the same configuration as the system for cooling an electric vehicle according to the third exemplary embodiment of the present invention of FIG. 3 and the system for cooling an electric vehicle according to the fourth exemplary embodiment of the present invention is different from the system for cooling an electric vehicle according to the third exemplary embodiment of the present invention only in terms of the position of the cooling water temperature sensor 14.

In particular, the cooling water temperature sensor 14 of the system for cooling an electric vehicle according to the fourth exemplary embodiment of the present invention is disposed at the output terminal of the electronic water pump 4 and the output terminal of the motor 6. A cooling control controller 164 has the same configuration as the cooling control controller 163 and the rest configuration is the same as FIG. 3 and therefore the detailed description thereof will be omitted.

Hereinafter, the cooling control method of the system for cooling an electric vehicle according to the first exemplary embodiment of the present invention will be described with reference to FIG. 6.

First, the cooling control controller 161 extracts input parameters from values which are sensed by the wind velocity sensor 17, the temperature sensor 18, the refrigerant temperature sensor 19, the cooling water temperature sensor 14, and the like (S101).

The cooling control controller 161 determines whether the temperature of the power conversion component is equal to or more than the preset safety temperature (S102).

In step S102, when the temperature of the power conversion component 5 is less than the preset safety temperature, the cooling is unnecessary and therefore the cooling control controller 161 controls the electronic water pump controller 15b to set the RPM of the electronic water pump (EWP) to be set "0" (S103).

Meanwhile, in step S102, when the temperature of the power conversion component 5 is equal to or more than the preset safety temperature, the cooling is required and therefore the cooling control controller 161 determines whether the current vehicle is in the driving mode to perform the cooling control (S104). The power conversion component 5 is driving when the vehicle is in the driving mode, and therefore the cooling control needs to be performed and the driving of the power conversion component 5 stops when the vehicle is not in the driving mode, and therefore the minimum cooling control may be performed.

In particular, in the case in which the temperature of the power conversion component 5 is equal to or more than the preset safety temperature but the vehicle is not in the driving mode, when the vehicle is driven and then stops, residual heat may remain in the power conversion component 5, thereby performing the minimum cooling control. Therefore, when the temperature of the power conversion component 5 is equal to or more than the preset safety temperature but the vehicle is not in the driving mode, the cooling control controller 161 controls the electronic water pump controller 15b to set the RPM of the electronic water pump 4 to be set to the minimum value (S105).

Meanwhile, in step S104, when the vehicle is in the driving mode, the cooling control controller 161 calculates the heat value of the power conversion component 5 to perform the cooling control (S106). In this case, the heat value $Q_{heat\ value}$ is calculated as the experiment value in advance or may be calculated by a general method.

Next, the cooling control controller 161 calculates the targeted cooling water flow rate $V_{Rad,in,air}$ based on the above Equation 1 (S107).

Next, the cooling control controller 161 uses the calculated targeted cooling water flow rate $V_{in,air}$ to determine the RPM of the electronic water pump 4 (S108).

Next, the cooling control controller 161 determines whether the RPM of the current electronic water pump 4 is the maximum value or the temperature of the cooling water at the outlet side of the radiator 1 is equal to or more than the maximum required temperature (S109). In this case, as the maximum required temperature for the temperature of the cooling water at the outlet side of the radiator, the preset values for each specification may be used. The case in which the RPM of the electronic water pump 4 is the maximum value in step S109 means the case in which the electronic water pump 4 is maximally driven. In particular, when the electronic water pump 4 is maximally driven or the temperature of the cooling water at the outlet side of the radiator 1 is equal to or more than the maximum required temperature, the cooling control controller 161 determines that the cooling is not normally performed only by the driving of the electronic water pump 4 and determines the step S109 to additionally operate the fan of the radiator 1.

When any one of the conditions is not satisfied in step S109, the cooling control controller 161 sets the level of the fan 2 of the radiator to be "0" so as not to drive the fan 2 of the radiator.

On the other hand, when any one of the conditions is satisfied in step S109, the cooling control controller 161 calculates the targeted air flow rate $V_{in,air,goal}$ based on the above Equation 2 (S111).

The cooling control controller 161 determines the level of the fan of the radiator using the calculated targeted air flow rate (S112).

When the targeted air flow rate $V_{in,air,goal}$ is calculated in step S111, depending on the above Equation 2 in the first exemplary embodiment of the present invention, the targeted air flow rate is calculated using the wind velocity $V_{in,air}$ by the wind velocity sensor 17 at the inlet side of the A/C condenser 10 and the outdoor temperature Tin, air by the temperature sensor 18 at the inlet side of the A/C condenser 10.

However, according to the second exemplary embodiment of the present invention, the targeted air flow rate $V_{in,air,goal}$ is calculated using the above Equation 3 instead of the equation 2. In particular, according to the second exemplary embodiment of the present invention, the targeted air flow rate is calculated using the intermediate temperature TM between the A/C condenser 10 and the radiator 1, instead of the wind velocity and the outdoor temperature. In this case, the intermediate temperature TM is a value measured by the temperature sensor 18 which is disposed between the A/C condenser 10 and the radiator 1.

In particular, the cooling system according to the second exemplary embodiment of the present invention may use the intermediate temperature value passing through the A/C condenser 10 to calculate the targeted air flow rate based on the above Equation 3 to more accurately calculate the targeted air flow rate in consideration of a heat value of the A/C condenser 10.

Hereinafter, the cooling control method of the system for cooling an electric vehicle according to the third exemplary embodiment of the present invention will be described with reference to FIG. 7.

Figure 6:
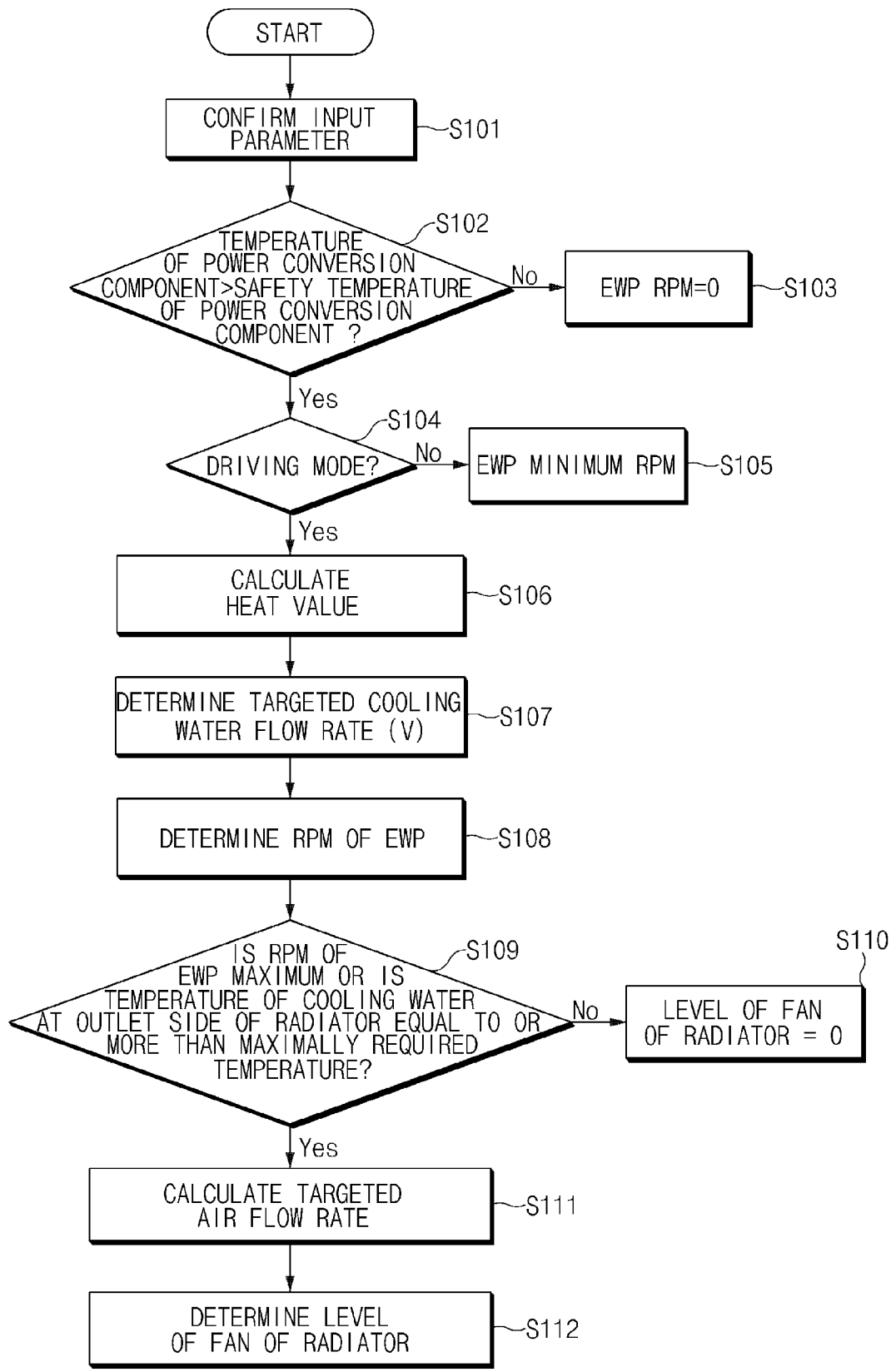
FIG. 6 is a flow chart illustrating a cooling control method of the system for cooling an electric vehicle according to the first exemplary embodiment of FIG. 1.

Steps S201 to S210 of the cooling control method of the system for cooling an electric vehicle according to the third exemplary embodiment of the present invention are the same as steps S101 to S110 of FIG. 6 and therefore the detailed description thereof will be omitted. Therefore, the cooling control method will be described from step S211.

If it is determined that the current RPM of the electronic water pump 4 is the maximum value or the temperature of the cooling water at the outlet side of the radiator 1 is equal to or more than the maximum required temperature in S209, the cooling control controller 163 sets the level of the fan 2 of the radiator to be low (first level) (S211).

Next, the cooling control controller 163 determines whether the temperature of the power conversion component 5 or the temperature of the cooling water at the outlet side of the radiator is increased (S212) and if it is determined that the temperature of the power conversion component 5 is increased or the temperature of the cooling water at the outlet side of the radiator is increased, sets the level of the fan 2 of the radiator to be a high level (second level) (S214).

Here, the low level of the fan 2 of the radiator means the first level is not off but means the first level after on and the high level means that the second level is not on but means the second level after on.

Figure 7:
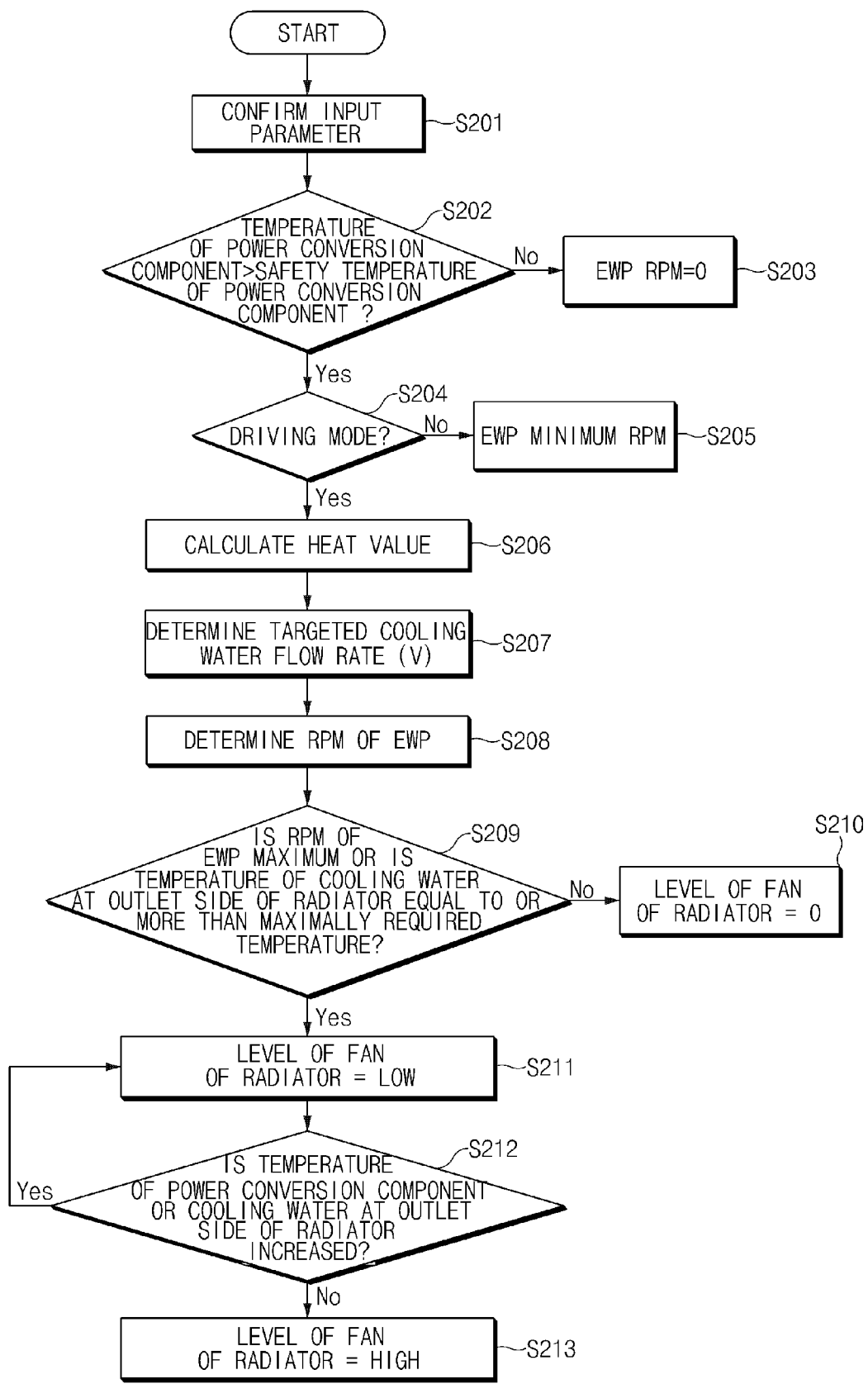
FIG. 7 is a flow chart illustrating a cooling control method of the system for cooling an electric vehicle according to the third exemplary embodiment of FIG. 3.

The foregoing cooling control method of FIG. 7 may also be applied to the cooling control method of the system for cooling an electric vehicle according to the fourth exemplary embodiment of the present invention of FIG. 4.

As described above, the present invention discloses four exemplary embodiments depending on the positions of the cooling water temperature sensor, the outdoor temperature sensor, the wind velocity sensor, and the like and each cooling system calculates the targeted cooling water flow rate to control the electronic water pump and when the electronic water pump is driven at the maximum speed, calculates the targeted air flow rate or controls the fan of the radiator based on whether the temperature of the power conversion component or the temperature of the cooling water at the outlet side of the radiator is increased.

Figure 5:
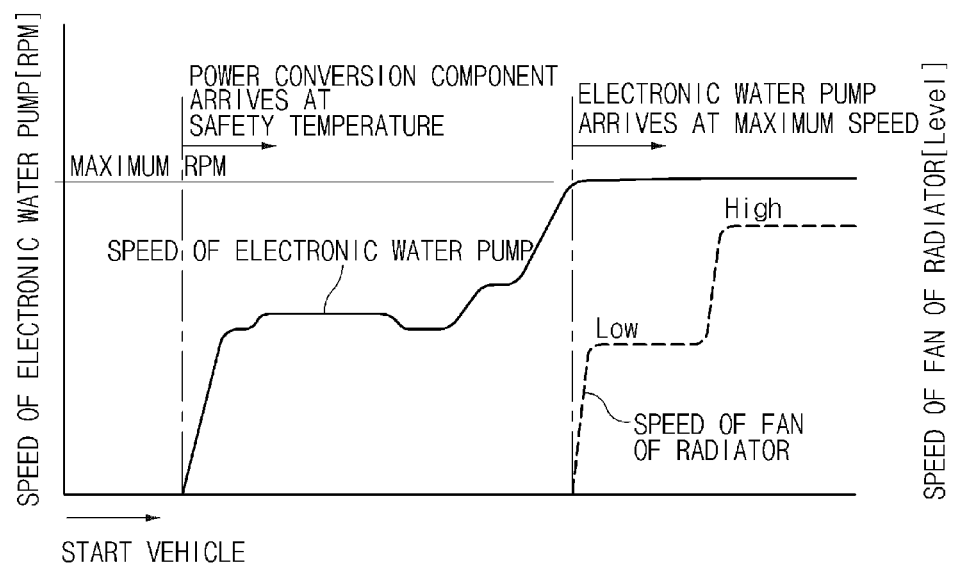
FIG. 5 is a graph illustrating cooling control conditions according to the present invention.

FIG. 5 is a graph illustrating the cooling control conditions according to the present invention, in which when the temperature of the power conversion component 5 reaches the safety temperature after the vehicle is driven, the speed of the electronic water pump is increased and when the speed of the electronic water pump is the maximum value, the fan of the radiator starts to be driven. In this case, the fan of the radiator is changed from the low level (first level) to the high level (second level).

As described above, according to the exemplary embodiments of the present invention, it is possible to improve the cooling efficiency, reduce power consumption, and increase the performance and lifespan of the power conversion components by preventing the system for cooling an electric vehicle from overcooling.

The exemplary embodiments of the present invention described above have been provided for illustrative purposes. Therefore, those skilled in the art will appreciate that various modifications, alterations, substitutions, and additions are possible without departing from the scope and spirit of the invention as disclosed in the accompanying claims and such modifications, alterations, substitutions, and additions fall within the scope of the present invention.

What is claimed is:

1. A system for cooling a vehicle including a power conversion component, a motor, a radiator, an electronic water pump, and a cooling unit cooling the power conversion component, the system comprising:
   an air conditioning unit configured to interlock with the cooling unit to perform air conditioning of the vehicle;
   a temperature sensor configured to sense a temperature of air in the air conditioning unit;
   a cooling water temperature sensor configured to sense a temperature of cooling water flowing in the cooling unit; and
   a cooling control controller configured to calculate a targeted air flow rate and a targeted cooling water flow rate to control the cooling of the cooling unit,
   wherein the cooling control controller uses property value of cooling water at an inlet side of the radiator, a temperature difference between the inlet side and an outlet side of the radiator, and a heat value of the power conversion component to calculate the targeted cooling water flow rate, such that when a temperature of the power conversion component is equal to or more than a preset safety temperature and the vehicle is in a driving mode, the cooling control controller determines an RPM of the electronic water pump depending on the targeted cooling water flow rate.

2. The system according to claim 1, further comprising:
   a wind velocity sensor configured to sense a wind velocity of air entering the air conditioning unit.

3. The system according to claim 2, wherein the wind velocity sensor is disposed at an input terminal of the air conditioning unit.

4. The system according to claim 1, wherein the temperature sensor is disposed at an input terminal of the air conditioning unit.

5. The system according to claim 1, wherein the temperature sensor is disposed between the air conditioning unit and the radiator.

6. The system according to claim 1, wherein the cooling water temperature sensor includes:
   a first cooling water temperature sensor configured to be disposed at an input side of the radiator; and
   a second cooling water temperature sensor configured to be disposed at an output side of the radiator.

7. The system according to claim 1, wherein the cooling water temperature sensor includes:
   a first cooling water temperature sensor configured to be disposed at an output side of the electronic water pump; and
   a second cooling water temperature sensor configured to be disposed at an output side of the motor.

8. The system according to claim 7, wherein the cooling control controller calculates the targeted air flow rate to control a level of a fan of the radiator depending on the targeted air flow rate, when a current RPM of the electronic water pump is a maximum value or a temperature of the cooling water at the outlet side of the radiator is equal to or more than a maximum required temperature.

9. The system according to claim 8, wherein the cooling control controller uses the property values of cooling water of the inlet side of the radiator, a wind velocity and a temperature of air entering the air conditioning unit, a temperature of cooling water of the inlet side of the radiator, and the heat value of the power conversion component to calculate the targeted air flow rate.

10. The system according to claim 8, wherein the cooling control controller uses the property values of cooling water of the inlet side of the radiator, an intermediate temperature between the radiator and the air conditioning unit, a heat value of the power conversion component, and a temperature of the cooling water at the inlet side of the radiator to calculate the targeted air flow rate.

11. The system according to claim 7, wherein the cooling control controller sets the level of the fan of the radiator to be a first level when the current RPM of the electronic water pump is the maximum value or the temperature of cooling water of the outlet side of the radiator is equal to or more than the maximum required temperature and then sets the level of the fan of the radiator to be a second level when the temperature of the power conversion component or the cooling water of the outlet side of the radiator is increased.

12. A cooling method of a system for cooling a vehicle including an air conditioning unit, a power conversion component, a motor, a radiator, an electronic water pump, and a cooling unit to cool the power conversion component, the method comprising the steps of:
  determining whether a temperature of the power conversion component is equal to or more than a safety temperature and the vehicle is in a driving mode condition;
  calculating a targeted cooling water flow rate when the temperature of the power conversion component is equal to or more than the safety temperature and the vehicle is in the driving mode condition to control a driving of the electronic water pump depending on the targeted cooling water flow rate; and
  controlling a fan of the radiator when the electronic water pump is maximally driven or a temperature of cooling water at an outlet side of the radiator is equal to or more than a maximum required temperature,
  wherein the step of controlling the fan of the radiator further comprises:
  using property values of cooling water of an inlet side of the radiator, a wind velocity and a temperature of air entering the air conditioning unit, a temperature of cooling water of the inlet side of the radiator, and a heat value of the power conversion component to calculate a targeted air flow rate; and controlling a level of the fan of the radiator using the targeted air flow rate.

13. A cooling method of a system for cooling a vehicle including an air conditioning unit, a power conversion component, a motor, a radiator, an electronic water pump, and a cooling unit to cool the power conversion component, the method comprising the steps of:
  determining whether a temperature of the power conversion component is equal to or more than a safety temperature and the vehicle is in a driving mode condition;
  calculating a targeted cooling water flow rate when the temperature of the power conversion component is equal to or more than the safety temperature and the vehicle is in the driving mode condition to control a driving of the electronic water pump depending on the targeted cooling water flow rate; and
  controlling a fan of the radiator when the electronic water pump is maximally driven or a temperature of cooling water at an outlet side of the radiator is equal to or more than a maximum required temperature,
  wherein the step of controlling the fan of the radiator further comprises:
  using property values of cooling water of an inlet side of the radiator, an intermediate temperature between the radiator and the air conditioning unit, a heat value of the power conversion component, and a temperature of cooling water at the inlet side of the radiator to calculate a targeted air flow rate; and
  controlling a level of the fan of the radiator using the targeted air flow rate.

14. A cooling method of a system for cooling a vehicle including an air conditioning unit, a power conversion component, a motor, a radiator, an electronic water pump, and a cooling unit to cool the power conversion component, the method comprising the steps of:
  determining whether a temperature of the power conversion component is equal to or more than a safety temperature and the vehicle is in a driving mode condition;
  calculating a targeted cooling water flow rate when the temperature of the power conversion component is equal to or more than the safety temperature and the vehicle is in the driving mode condition to control a driving of the electronic water pump depending on the targeted cooling water flow rate; and
  controlling a fan of the radiator when the electronic water pump is maximally driven or a temperature of cooling water at an outlet side of the radiator is equal to or more than a maximum required temperature,
  wherein the step of controlling the fan of the radiator further comprises:
  determining whether a current RPM of the electronic water pump is a maximum value or a temperature of cooling water at an outlet side of the radiator is equal to or more than a maximum required temperature;
  setting a level of the fan of the radiator to be a first level when the current RPM of the electronic water pump is the maximum value or the temperature of the cooling water at the outlet side of the radiator is equal to or more than the maximum required temperature; and
  setting the level of the fan of the radiator to be a second level when the temperature of the power conversion component or the temperature of the cooling water at the outlet side of the radiator is increased.

15. A non-transitory computer readable medium containing program instructions executed by a processor, the computer readable medium comprising:
  program instructions that determine whether a temperature of a power conversion component is equal to or more than a safety temperature and a vehicle is in a driving mode condition;
  program instructions that calculate a targeted cooling water flow rate when the temperature of the power conversion component is equal to or more than the safety temperature and the vehicle is in the driving mode condition to control a driving of an electronic water pump depending on the targeted cooling water flow rate; and
  program instructions that control a fan of a radiator when the electronic water pump is maximally driven or a temperature of cooling water at an outlet side of the radiator is equal to or more than a maximum required temperature,
  wherein the program instructions that control the fan of the radiator further include;
  program instructions that use property values of cooling water of an inlet side of the radiator, a wind velocity and a temperature of air entering the air conditioning unit, a temperature of cooling water of the inlet side of the radiator, and a heat value of the power conversion component to calculate a targeted air flow rate; and control a level of the fan of the radiator using the targeted air flow rate.

* * * * *